(12) United States Patent
Sumi et al.

(10) Patent No.: US 9,511,349 B2
(45) Date of Patent: Dec. 6, 2016

(54) MINERAL WOOL PRODUCT

(75) Inventors: Jure Sumi, Skofja Loka (SI); Gorazd Sebenik, Skofja Loka (SI); Sasa Bavec, Skofja Loka (SI); Gregor Kejzar, Skofja Loka (SI)

(73) Assignee: Knauf Insulation, Vise (BE)

( * ) Notice: Subject to any disclaimer, the term of this patent is extended or adjusted under 35 U.S.C. 154(b) by 54 days.

(21) Appl. No.: 14/119,975

(22) PCT Filed: May 31, 2012

(86) PCT No.: PCT/EP2012/060311
§ 371 (c)(1),
(2), (4) Date: Nov. 25, 2013

(87) PCT Pub. No.: WO2012/164044
PCT Pub. Date: Dec. 6, 2012

(65) Prior Publication Data
US 2014/0130410 A1 May 15, 2014

(30) Foreign Application Priority Data

May 31, 2011 (EP) .................... 111683116

(51) Int. Cl.
| | | |
|---|---|---|
| *B01J 20/22* | (2006.01) | |
| *B01J 20/28* | (2006.01) | |
| *A01G 31/00* | (2006.01) | |
| *D04H 1/407* | (2012.01) | |
| *D04H 1/4209* | (2012.01) | |
| *D04H 1/46* | (2012.01) | |
| *A01G 9/10* | (2006.01) | |
| *A01G 1/00* | (2006.01) | |

(52) U.S. Cl.
CPC ......... *B01J 20/28038* (2013.01); *A01G 1/001* (2013.01); *A01G 9/1086* (2013.01); *A01G 31/001* (2013.01); *D04H 1/407* (2013.01); *D04H 1/4209* (2013.01); *D04H 1/46* (2013.01); *Y02P 60/216* (2015.11)

(58) Field of Classification Search
CPC ......................................................... B01J 20/22
USPC ......................................................... 502/401
See application file for complete search history.

(56) References Cited

U.S. PATENT DOCUMENTS

| | | | |
|---|---|---|---|
| 4,879,172 | A | 11/1989 | Meunier |
| 5,081,791 | A | 1/1992 | Baron |
| 5,086,585 | A | 2/1992 | Kafka |
| 5,287,651 | A | 2/1994 | De Graaf |
| 5,567,478 | A | 10/1996 | Houben et al. |
| 2012/0036733 | A1 | 2/2012 | Dehn |
| 2012/0157904 | A1 | 6/2012 | Stein |

FOREIGN PATENT DOCUMENTS

| | | |
|---|---|---|
| DE | 4420088 A1 | 12/1995 |
| EP | 0280338 A1 | 8/1988 |
| EP | 0485277 A1 | 5/1992 |
| GB | 2127005 A | 4/1984 |
| GB | 2269602 A | 2/1994 |
| JP | 2002335782 | 11/2002 |
| WO | 8700394 A1 | 1/1987 |
| WO | 91/08662 A1 | 6/1991 |
| WO | 94/26093 A1 | 11/1994 |
| WO | 10/69592 A1 | 6/2010 |
| WO | 11/15377 A1 | 2/2011 |

OTHER PUBLICATIONS

International Search Report and Written Opinion received for PCT Application No. PCT/EP2012/060311, mailed on Jul. 30, 2012, 8 pages.

*Primary Examiner* — Edward Johnson
(74) *Attorney, Agent, or Firm* — Knauf Insulation, Inc.; James K. Blodgett

(57) ABSTRACT

A mineral wool batt for use as a plant growth medium, particularly in applications for growing vegetation (including plants) in which water retention and/or the avoidance of water run-off is of interest. The mineral wool batt has an absorbent layer which comprises needled mineral wool fibers; superabsorbent particles in the absorbent layer may be sandwiched between a denser upper and/or lower barrier layer(s) which assist in preventing their escape.

15 Claims, 4 Drawing Sheets

MINERAL WOOL PRODUCT

CROSS-REFERENCE TO RELATED APPLICATIONS

This application is a U.S. national counterpart application of International Application Serial No. PCT/EP2012/060311, filed May 31, 2012, under 35 U.S.C. §371, which claims priority to European Application Serial No. 11168311.6, filed May 31, 2011, the entire disclosures of each of which are hereby incorporated by reference herein.

TECHNICAL FIELD

The present invention relates to a mineral wool product for use in horticultural, landscaping, green roof or urban gardening applications, more particularly for growing vegetation (including plants) in which water retention and/or the avoidance of water run-off is of interest.

BACKGROUND

The use of mineral fibre products for cultivating plants is disclosed, for example, in EP0280338A1 which describes the incorporation of higher density flakes of mineral fibres (which have greater water retaining capacity) in a matrix of its mineral fibre mat. WO 91/08662 discloses a plant growing medium comprising mineral fibres which incorporates lignite as an agent for increasing the water retention ability; traditionally used manufacturing agents and aids such as binding agents, tensides, superabsorbents, and agents for controlling the air content and the water retention properties of the growing medium, such as expanded clay, foam plastic compounds, vermiculite, perlite, cellulose-containing compounds and top soil may also be incorporated.

Despite these and other proposals, a need still exists for a more advantageous form of mineral wool product for the applications envisaged.

SUMMARY

According to one of its aspects, the present invention provides a mineral wool product as defined in claim 1. Other aspects of the invention are defined in other independent claims. Dependent claims define preferred and/or alternative aspects of the invention.

DETAILED DESCRIPTION

Figure 1:
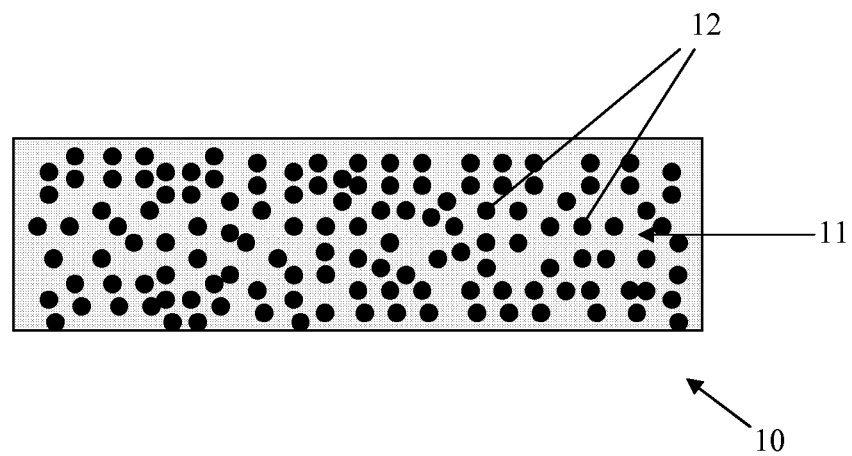
FIG. 1 shows a cross-section of one embodiment of a mineral wool batt.

In accordance with one of its aspects, the present invention provides a mineral wool batt comprising an absorbent layer comprising mineral wool fibres, characterised in that the absorbent layer comprises needled mineral wool fibres and superabsorbent particles.

The mineral fibres are preferably stone wool; they may be glass wool. They may be crimped; they may have an average diameter between 2 and 9 microns.

Physical integrity of the batt and retention of the superabsorbent particles in the batt are preferably provided by intertwining of the mineral wool fibres, for example by needling; this avoids the necessity of using a heat curable binder which, in turn, avoids the need of passing the mineral wool batt through a curing oven (typically operated at a temperature of about 200° C.) which could degrade or even destroy the superabsorbent particles. Furthermore, avoiding the use of constituents of some binder systems, notably constituents of phenol formaldehyde based binder systems, which may be deleterious to plant growth, provides an additional advantage.

Whilst the mineral wool batt is preferably substantially devoid of binder, a small amount of binder may be present, for example in a quantity of less than 1% by weight, preferably less than 0.5% or less than 0.3% by weight. Binder may be present if, for example, the mineral wool batt incorporates recycled mineral wool fibres that were originally manufactured using a binder. Nevertheless, the mineral wool batt is preferably manufactured without applying binder to any freshly formed fibres.

During needling or intertwining of the mineral wool fibres, needling aids, for example oils or lubricants, may be used.

The structure of needled fibres is particularly favourable to initial and/or cycled water retention and/or initial and/or cycled water retention content and/or VSE water content and/or WOK water content, in particular when combined with the presence of superabsorbent particles and/or a reduction in the amount of binder for the fibres (and preferably the elimination of the presence of a binder for the fibres).

The nominal thickness of the mineral wool batt may be $\geq 10$ mm or $\geq 15$ mm or $\geq 40$ mm or $\geq 50$ mm; it may be $\leq 140$ mm or $\leq 120$ mm. The nominal thickness of the absorbent layer or core may be $\geq 8$ mm or $\geq 10$ mm or $\geq 30$ mm or $\geq 40$ mm and/or $\leq 130$ mm or $\leq 110$ mm. Where upper and/or lower barrier layers are provided, these may have a nominal thickness which is $\geq 3$ mm or $\geq 5$ mm and/or $\leq 15$ mm or $\leq 12$ mm.

The average density of the mineral wool batt may be $\geq 20$ kg/m$^3$, preferably $\geq 40$ kg/m$^3$; it may be $\leq 200$ kg/m$^3$.

The density of the absorbent layer or core of the mineral wool batt may be $\geq 20$ kg/m$^3$, preferably $\geq 30$ kg/m$^3$; it may be $\leq 190$ kg/m$^3$, preferably $\leq 150$ kg/m$^3$. The density of the upper and/or lower barrier layers of the mineral wool batt may be $\geq 25$ kg/m$^3$, preferably $\geq 50$ kg/m$^3$; it may be $\leq 200$ kg/m$^3$, preferably $\leq 150$ kg/m$^3$.

The density of the upper and/or lower barrier layers when provided may be greater than the density of the absorbent layer or core by at least 5 kg/m$^3$, preferably by at least 10 kg/m$^3$, more preferably by at least 15 kg/m$^3$.

The superabsorbent particles may comprise superabsorbent polymer particles; they may be adapted to absorb at least 100 times or at least 200 times their own weigh of distilled water, preferably at least 400 times their own weight of distilled water.

The superabsorbent polymer particles may be selected from the group consisting of: poly-acrylic acid sodium salts; polyacrylamide copolymers, copolymers of acrylamide and sodium acrylate, ethylene maleic anhydride copolymers, cross-linked carboxymethyl celluloses, polyvinyl alcohol copolymers, cross-linked polyethylene oxides, and starch grafted copolymer of polyacrylonitrile.

The mineral wool batt is preferably devoid or substantially devoid of:
- carbonaceous materials other than the superabsorbent particles, for example, lignite which would increase its water retention ability; and/or
- cellulose fibres.

The particle size of the superabsorbent particles is preferably selected such that:
- 90%, and more preferably 95% of the particles (by weight and/or by number) have a diameter of less than 1 mm and/or
- The average particle size (by weight and/or by number) is within the range of 0.4-0.8 mm, and preferably within the range 0.5-0.7 mm and/or
- 80% of the particles (by weight and/or by number) have a diameter within the range of 0.4-2.1 mm, and preferably within the range 0.5-2.0 mm and/or
- 20% of the particles (by weight and/or by number) have a diameter within the range of 0.05-0.5 mm.

The particle size distribution may be determined by a sieve analysis (also known as a graduation test); a typical procedure for such an analysis comprises passing a representative sample of particles through a series of sieves in a nested stack, each successive sieve in the nested stack having a wire screen with openings that are smaller than the openings of the previous sieve in the stack and weighing the particles retained by each sieve after mechanical shaking.

The mineral wool batt may comprise at least 10 $g/m^2$ of superabsorbent particles (dry weight of superabsorbent particle per surface area of mineral wool batt) and preferably at least 50 $g/m^2$ or at least 75 $g/m^2$; it may comprise not more than 250 $g/m^2$ or not more than that 200 $g/m^2$ or not more than 150 $g/m^2$ of superabsorbent particles.

The mineral wool batt may also comprise one or more fertilisers and/or pesticides and/or herbicides and/or growing aids and/or seeds. The mineral wool batt of the invention is particularly suitable for use in one or more of the following applications:
- Particularly in arid climates, growing vegetation or crops or growing grass for sports facilities, particularly golf courses. The mineral wool batts may be covered with a surface layer of soil or sand. The mineral wool batts may be installed at their desired site prior to seeding or planting of plants or vegetation. Alternatively, the mineral wool batts may be used as a support for the initial growing of plants or vegetation under controlled or favourable conditions prior to transfer of the mineral wool batts incorporating pre-grow vegetation to their desired site.
- Particularly on slopes and inclines, for example at the upper portions of landscaped slopes or slopes along motorways or transport cuttings, for preventing run-off of rainwater from the elevated portions and thus favouring retention of vegetation at the upper portions of such slopes or inclines.
- For use in pots, for example for growing pot plants.
- For use as part of green roof systems as a growing medium.
- For use in herb and/or other crop cultivation.
- For use in urban gardening applications.

According to another aspect, the invention provides a method of growing vegetation in which the vegetation is grown on a growth medium comprising a mineral fibre batt comprising needled mineral wool fibres. At least one surface of the mineral fibre batt may be exposed so that the vegetation is grown from an exposed surface directly from the mineral fibre batt. Alternatively, the mineral wool batt may be partially, substantially of completely covered, for example be sand, soil or another growing medium, such that the vegetation is grown through a growing medium covering the mineral wool batt.

Figure 2:
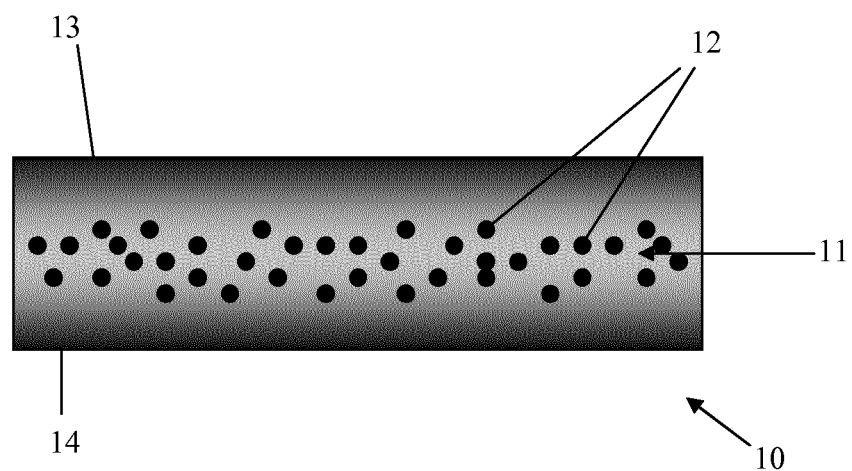
FIG. 2 shows a cross-section of another embodiment of a mineral wool batt.

Non-limiting examples of the invention are described below with reference to:

FIG. 1 which is a cross-section of one embodiment of a mineral wool batt;

FIG. 2 which is a cross-section of another embodiment of a mineral wool batt; and FIGS. 3 to 7 which are schematic representations of stages in preferred manufacturing techniques for the batt of FIG. 2.

The mineral wool batt 10 shown in FIG. 1 comprises an absorbent layer 11 comprising superabsorbent particles 12 held between fibres of needled mineral wool. In this embodiment, the superabsorbent particles 12 are distributed substantially evenly over the thickness of the mineral wool batt.

The mineral wool batt 10 shown in FIG. 2 comprises an absorbent layer in the form of a core 11 comprising super absorbent particles 12 sandwiched between an upper barrier layer 13 and a lower barrier layer 14. The superabsorbent particles 12 are retained between the interstices of the fibres of the absorbent layer or core 11 (as in FIG. 1) and also prevented from escaping from the major surface of the batt by the upper 13 and lower 14 barrier layers of mineral wool which have a density greater than that of the core.

Figure 3:
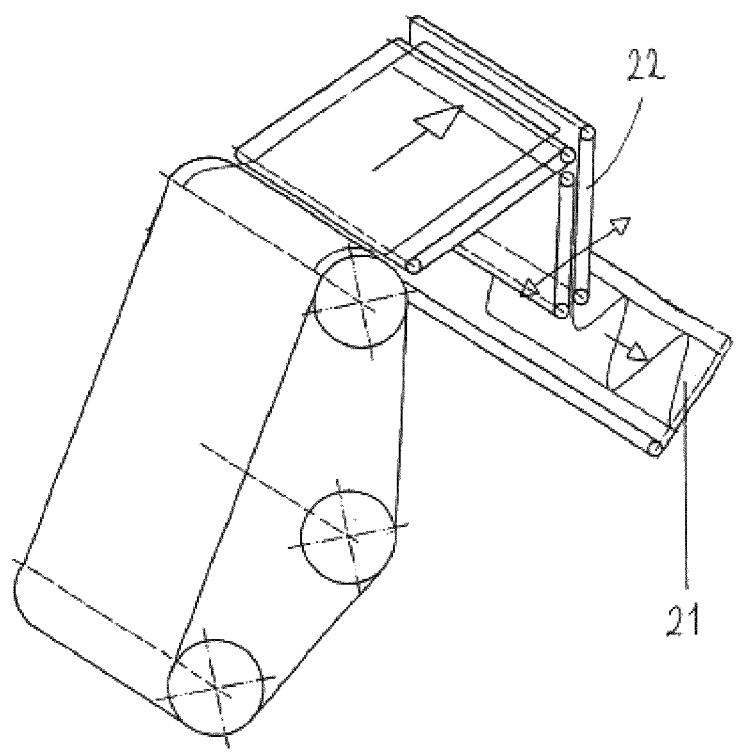
FIGS. 3-7 show schematic representations of stages in preferred manufacturing techniques for the batt of FIG. 2.

The mineral wool batt 10 may be manufactured using the following steps:

In an initial step, represented in FIG. 3, a semi-finished mineral wool batt 21 is provided by assembling mineral wool fibres in to a blanket. The semi-finished mat may be provided by folding layers of mineral wool fibres using a reciprocating motion of a pendulum 22 so that fibres are evenly distributed in several layers and subsequently compressing this blanket to an initially desired density, for example in the range of 40 to 140 $kg/m^3$. The semi-finished batt 21 is free of binder, no binder having been applied to the fibres or to the blanket.

Figure 4:
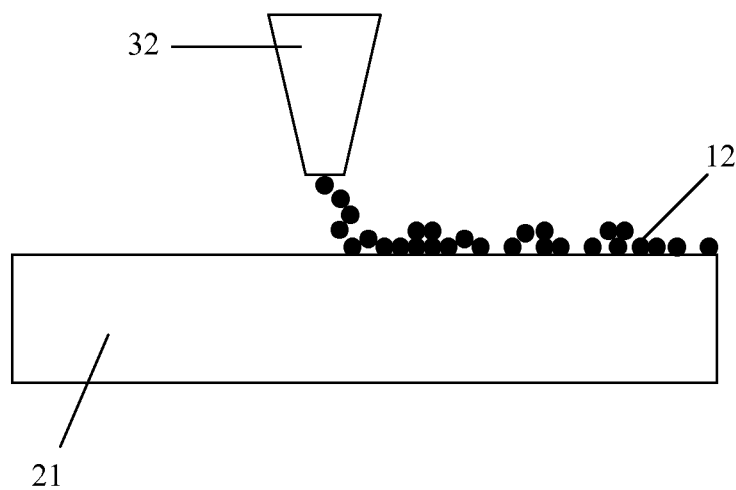

In a subsequent step, represented in FIG. 4, a desired quantity of superabsorbent particles 12 is distributed at an upper surface of the semi-finished mineral wool batt 21 via a nozzle 32 as the batt 21 advances along a production line. Preferably, the superabsorbent particles are distributed substantially evenly over substantially the entire upper surface of the batt 21; a border strip of, for example, about 5-15 mm along each side edge of the upper surface of the batt 21 may nevertheless remain substantially free of superabsorbent particles so as to avoid spillage of the superabsorbent particles during their applicant and/or during subsequent operations.

Once the superabsorbent particles have been distributed at the upper surface of the batt 21, a moving covering belt (not shown) is applied to cover the upper surface and the superabsorbent particles and travels with the batt to the next step in the production process so at to minimise fall off of the superabsorbent particles from the batt 21. The covering belt may press some of the superabsorbent particles in to an upper surface of the batt 21.

Figure 5:
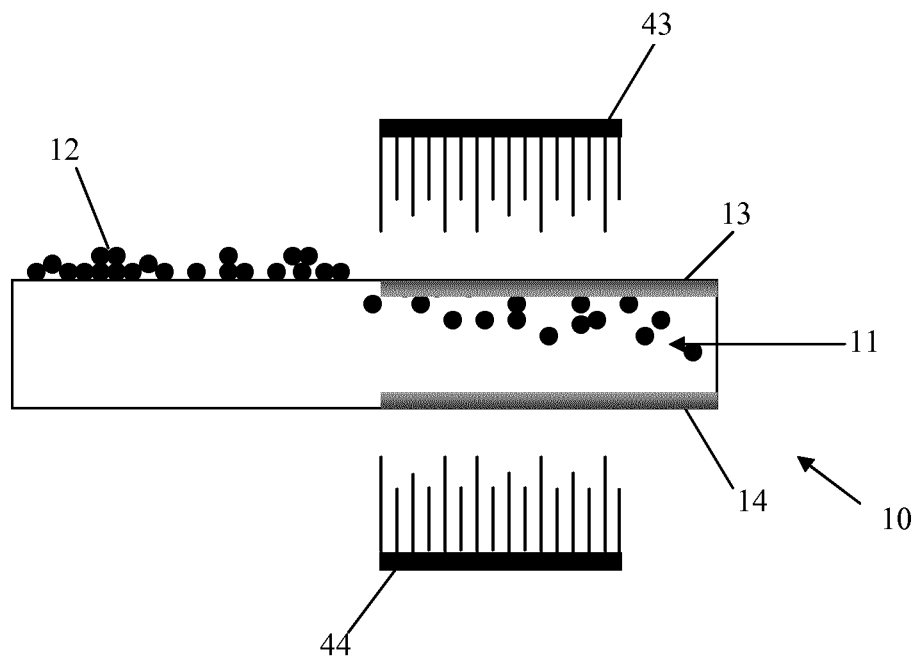

The semi-finished batt 21 then travels to a needling station represented in FIG. 5 at which, just after separation of the covering belt (not shown) from the upper surface of the semi-finished mineral wool batt 21, a series of upper surface needles 43 are reciprocated up and down through the upper surface of the semi-finished mineral wool batt 21. At the same time, a series of lower surface needles 44 are reciprocated up and down through the lower surface of the semi-finished mineral wool batt 21. The effects of the needling action are:

- To push the superabsorbent particles 12 in to the core 11 of the mineral wool batt and to needle the fibres between each other (which increases the stability of the mineral wool batt);
- To increase the density of the core 11 of the mineral wool batt 21, preferably to a density in the range 30 to 120 kg/m$^3$ or in the range 30 to 160 kg/m$^3$;
- To cause the super absorbent particles 12 to be trapped between fibres at the core 11 of the mineral wool batt;
- To create an upper barrier layer 13 and a lower barrier layer 14, each of which is has a higher density than the core 11 of the batt and each of which provides increased resistance to escape of superabsorbent particles 12 from the batt 21.

The density of the upper barrier layer 13 and a lower barrier layer 14 may be in the range 50 to 140 kg/m$^3$ or in the range 50 to 180 kg/m$^3$.

The needling operation may be conducted in a number of sub-steps. For example:

- A first sub-step in which (a) the upper surface needles are used with long strokes to push the superabsorbent particles in to the core or the batt 21 and (b) the lower surface needles 44 are used with short strokes to create the higher density needled lower barriers lay 14; and
- A second sub-step in which, once the superabsorbent particles have been pushed towards the core 11 of the batt 21, the upper surface needles 43 are used with short strokes to create the higher density needled upper barriers lay 13.

The mineral wool batt comprising superabsorbent particles may then be further processed and/or packaged (preferably under compression) in to rolls or blocks or even cut in to flocks ready for transportation and use.

In the FIGS. 4 and 5 arrangement, a pendulum 22 (or equivalent arrangement) is used to superimpose initial layers of fibres, for example by folding, to form a semi-finished mineral wool batt 21 and the superabsorbent particles are initially distributed at an upper surface of this assembled semi-finished mineral wool batt 21. Alternatively, or additionally, superabsorbent particles may be distributed on an initial layer of fibres, for example before a pendulum, prior to portions of the initial layer of fibres being superimposed upon each other to form an assembled semi-finished mineral wool batt. In this way, as illustrated in FIG. 6, superabsorbent particles 12' are positioned at or in the vicinity of the core 11 of the semi-finished mineral wool batt 21 before needling (due to prior super positioning of the layers from which the semi-finished mineral wool batt is assembled) and the needling then serves:

- If required, to push any superabsorbent particles 12 which are distributed at a surface of the semi-finished mineral wool batt 21 in to the absorbent later or core 11 of the mineral wool batt; and/or
- To more evenly distribute superabsorbent particles 12' which are already positioned at or in the vicinity of the absorbent layer or core 11; and/or
- to needle the fibres between each other (which increases the stability of the mineral wool batt); and/or
- To increase the density of the absorbent later or core 11 of the mineral wool batt 21, preferably to a density in the range 30 to 120 kg/m$^3$ or in the range 30 to 160 kg/m$^3$; and/or
- To cause the super absorbent particles 12 to be trapped between fibres at the absorbent layer or core 11 of the mineral wool batt; and/or
- To create an upper barrier layer 13 and a lower barrier layer 14, each of which is has a higher density than the core 11 of the batt and each of which provides increased resistance to escape of superabsorbent particles 12 from the batt 21.

Such an approach may be used when the semi-finished mineral wool batt 21 is assembled by superimposing two or more initial layers of fibres, for example by pendulum folding.

Figure 6:
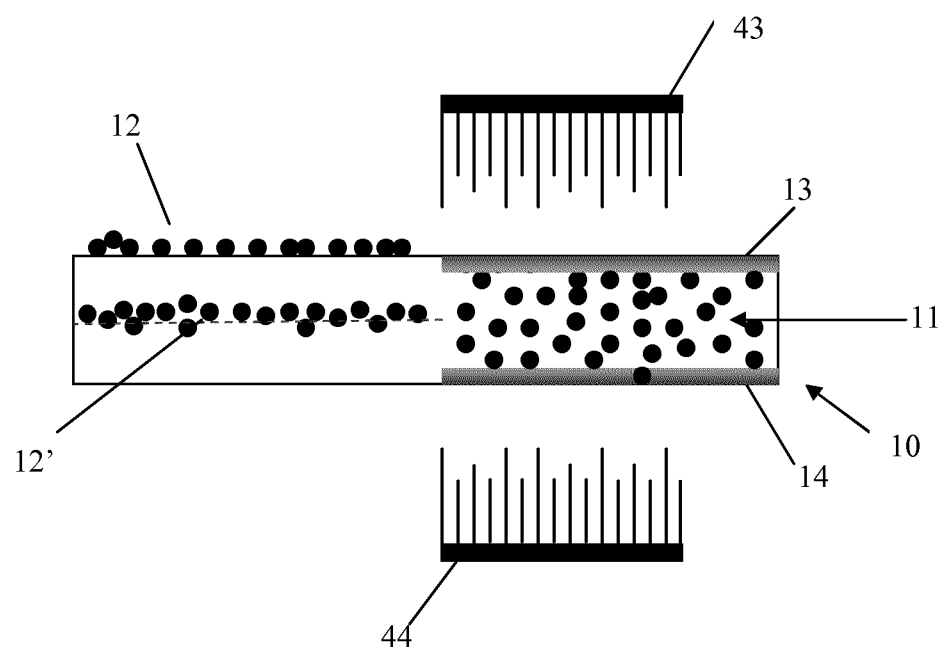
Figure 7:
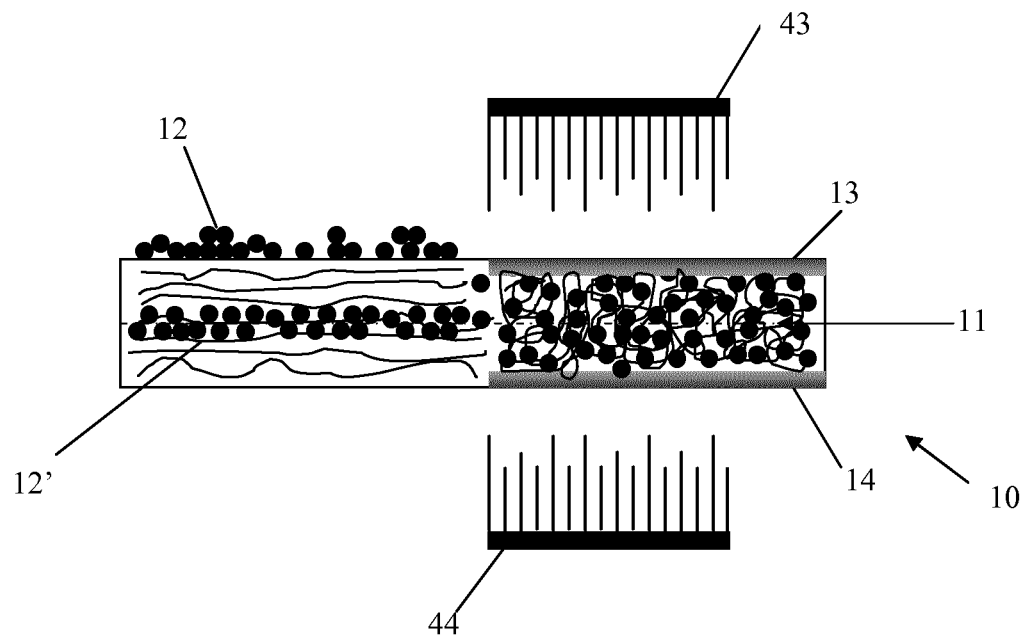

FIG. 7 is similar to FIG. 6 and illustrates: (i) on its left hand side the substantially horizontal orientation of fibres and the arrangement of superabsorbent particles in layer(s) prior to needling and (ii) on its right hand side, the effect of needling creating a more even distribution of superabsorbent particles throughout the thickness of the mineral wool batt, or at least the core of the mineral wool batt, and an orientation of fibres of the needled mineral wool batt with a significant proportion of the fibres having a vertical or non-horizontal component of direction and the mass of fibres forming interstices in which at least some of the super absorbent particles are trapped.

EXAMPLES

The following samples were tested:

| | |
|---|---|
| Examples 1.1 and 1.2 | batts of needled, stone wool fibres with no binder cut in to a ¼ circle with a radius of 19.5 cm. Density: 110 kg/cm$^3$; thickness: 20 mm; quantity of superabsorbent particles: 60 g/m$^2$ |
| Examples 2.1 and 2.2 | batts of needled, stone wool fibres with no binder cut in to a ¼ circle with a radius of 19.5 cm. Density: 110 kg/cm$^3$; thickness: 20 mm; no superabsorbent particles |
| Example 3 | batts of needled, stone wool fibres with no binder cut in to a 17 cm square. Density: 110 kg/cm$^3$; thickness: 20 mm; quantity of superabsorbent particles: 15 g/m$^2$ |
| Example 4 | batts of needled, stone wool fibres with no binder cut in to a 17 cm square. Density: 110 kg/cm$^3$; thickness: 20 mm; no superabsorbent particles |
| Examples 5.1 and 5.2 | As examples 1.1 and 1.2 but cut to size to fit test apparatus |
| Examples 6.1 and 6.2 | As example 3 but cut to size to fit test apparatus |
| Examples 7.1 and 7.2 | As examples 2.1, 2.2 and 4 but cut to size to fit test apparatus |

Initial Water Retention and Initial Water Content (Cycle 1-C1)

Three samples of each example were tested; the results presented below are the mean average of the three samples.

At the beginning of each test for initial water retention, each sample is weighed, its dry weight recorded, and then soaked in tap water for about 2 hours; the samples are then placed on a metal grid at normal room conditions (temperature about 20° C.±5° C.; pressure about 101 kPa±20%; relative humidity about 40% to 80%, preferably about 60%±10%) in the laboratory for conditioning. The samples are weighted after 5 minutes 1 day, 2 days, 3 days and 4 days.

Table 1 shows the water retention which is calculated as (mass of wet sample−mass of dry sample)/mass of dry sample and expressed as kg water per kg (dry weight) of mineral wool batt. The t0 initial water retention is defined as the water retention after five minutes (i.e. once the excess water from the sample being soaked is allowed to drain off).

TABLE 1 water retention (kg/kg)

| Example | 5 min (t0) | 1 day | 2 day | 3 day | 4 day |
|---|---|---|---|---|---|
| 1.1 | 10.4 | — | — | 4.6 | 2.7 |
| 1.2 | 10.4 | 8.1 | 5.9 | 3.5 | 1.4 |
| 2.1 | 7.3 | — | — | 2.1 | 0.1 |
| 2.2 | 8.7 | 6.5 | 4.3 | 2.0 | 0.1 |

Table 2 shows the water content which is calculated as (mass of wet sample−mass of dry sample)/mass of wet sample and expressed as a percentage. The initial water content is defined as the water content after five minutes (i.e. once the excess water from the sample being soaked is allowed to drain off).

TABLE 2 water content (%)

| Example | 5 min (t0) | 1 day | 2 day | 3 day | 4 day |
|---|---|---|---|---|---|
| 1.1 | 91 | — | — | 82 | 73 |
| 1.2 | 91 | 89 | 85 | 78 | 56 |
| 2.1 | 88 | — | — | 68 | 11 |
| 2.2 | 90 | 87 | 81 | 67 | 7 |

Cycled Water Retention and Cycled Water Content (Cycles 1 to 5-C1 to C5)

Cycled water retention and cycled water content of Examples 3 and 4 was evaluated in a similar way as above and defined as:

| Cycle 1 | C1 | Determined in the same way as initial water retention and initial water content |
| Cycle 2 | C2 | Determined in respect of samples which, after cycle 1 are dried, soaked again in tap water for at least 2 hours and re-measured |
| Cycle 3 | C3 | Determined in respect of samples which, after cycle 2 are dried, soaked again in tap water for at least 2 hours and re-measured |
| Cycle 4 | C4 | Determined in respect of samples which, after cycle 3 are dried, soaked again in tap water for at least 2 hours and re-measured |
| Cycle 5 | C5 | Determined in respect of samples which, after cycle 4 are dried, soaked again in tap water for at least 2 hours and re-measured | and in which the drying out of the samples between each cycle is carried out by allowing the samples to dry in the normal room conditions until their water retention is less than 0.1, preferably substantially 0. The results are shown in Tables 3, 4, 5 and 6. Three samples of each example were tested; the results presented below are the mean average of the three samples.

TABLE 3

Example 3-water retention (kg/kg) following each cycle

| Cycle | 5 min (t0) | 1 day | 2 day | 3 day | 4 day |
|---|---|---|---|---|---|
| C1 | 9.8 | 7.4 | 5.2 | 3.1 | 1.1 |
| C2 | 8.9 | 6.9 | 5.1 | 3.6 | 1.8 |
| C3 | 8.4 | 6.8 | 5.1 | 3.2 | 1.9 |
| C4 | 8.3 | 6.0 | 4.3 | 2.2 | 0.8 |
| C5 | 8.1 | 6.2 | 4.7 | 3.4 | 2.4 |

TABLE 4

Example 3-water content (%) following each cycle

| Cycle | 5 min (t0) | 1 day | 2 day | 3 day | 4 day |
|---|---|---|---|---|---|
| C1 | 90 | 87 | 84 | 78 | 65 |
| C2 | 89 | 87 | 84 | 76 | 65 |
| C3 | 89 | 86 | 81 | 69 | 44 |
| C4 | 89 | 86 | 82 | 77 | 71 |
| C5 | 89 | 86 | 82 | 75 | 58 |

TABLE 5

Example 4-water retention (kg/kg) following each cycle

| Cycle | 5 min (t0) | 1 day | 2 day | 3 day | 4 day |
|---|---|---|---|---|---|
| C1 | 8.6 | 6.5 | 4.7 | 2.7 | 0.9 |
| C2 | 8.0 | 6.0 | 4.1 | 2.5 | 1.1 |
| C3 | 7.8 | 6.1 | 4.4 | 2.5 | 1.1 |
| C4 | 7.4 | 5.3 | 3.4 | 1.3 | 0.2 |
| C5 | 7.4 | 5.7 | 4.0 | 2.7 | 1.6 |

TABLE 6

Example 4-water content (%) following each cycle

| Cycle | 5 min (t0) | 1 day | 2 day | 3 day | 4 day |
|---|---|---|---|---|---|
| C1 | 90 | 87 | 82 | 72 | 39 |
| C2 | 89 | 86 | 80 | 72 | 52 |
| C3 | 89 | 86 | 81 | 71 | 52 |
| C4 | 88 | 84 | 77 | 53 | 13 |
| C5 | 88 | 85 | 80 | 73 | 61 |

VSE Water Content (Vacuum Simulated Evaporation)

A vacuum simulated evaporation (VSE) test is performed using a sand suction table according to European standard EN 13041 of December 1999. The sample is cut to the internal dimensions of a rigid test ring (internal diameter 100 mm, height 50 mm, open at both ends and of known mass), weighed (dry weight), placed in the test ring and soaked in water until saturation. The test ring is then placed on the sand suction table and left for 24 hours to reach equilibrium conditions before being weighed so as to determine the water content of the sample. The test ring is then returned to the sand suction table, a vacuum of −3.2 cm water is applied through the base of the sand suction table and the sample is left in these conditions for 24 hours to reach equilibrium before being weighed again to determine the water content of the sample. The test ring is then returned to the sand suction table, a vacuum of −10 cm water is applied through the base of the sand suction table and the sample is left in these conditions for 24 hours to reach equilibrium before being weighed again to determine the water content of the sample. The procedure is repeated systematically so as the determine the water content of the sample after equilibrium after sequential application of a vacuum of −3.2 cm water, −10 cm water, −32 cm water, −50 cm water and −100 cm water, the results being shown in Table 7:

TABLE 7

VSE water content (%)

| After vacuum of: | −3.2 cm | −10 cm | −32 cm | −50 cm | −100 cm |
|---|---|---|---|---|---|
| Example 5.1 | 96 | 91 | 56 | 50 | 48 |
| Example 6.1 | 96 | 90 | 46 | 38 | 37 |
| Example 7.1 | 96 | 94 | 20 | 9 | 6 |

WOK Water Absorption

The WOK method (WOK=water uptake characteristic) as developed by Stichting RHP, Galgeweg 38, 2691 MG's-Gravenzande, The Netherlands www.rhp.nl is used to determine water re-absorption of examples 5.2, 6.2 and 7.2. The sample to be tested is placed in a ring, soaked in water until saturation, left to reach equilibrium on a sand suction table, weighed to determine its initial water content, dried to equilibrium on a sand suction table at a vacuum of −100 cm water and then further dried in an oven at 40° C. for 72 hours before being weighed (dry weight). The sample is arranged such that the mineral fibres are just in contact with water and its water content is determined as a function of time and expressed as a % of initial water content. Results are shown in Table 8:

TABLE 8

WOK water content (%)

| | Time (minutes) | | | | | |
|---|---|---|---|---|---|---|
| | 15 | 30 | 60 | 90 | 120 | 240 |
| Example 5.2 | 52 | 64 | 74 | 78 | 80 | 85 |
| Example 6.2 | 83 | 89 | 92 | 93 | 94 | 95 |
| Example 7.2 | 72 | 72 | 72 | 72 | 72 | 72 |

Preferred individual characteristics and combinations of characteristics of products in accordance with the invention are set out in the following tables:

Preferred Characteristics for Initial Water Retention (kg/kg):

| Characteristic | Preferred | More preferred | Most preferred |
|---|---|---|---|
| t0 initial water retention | ≥6.5 | ≥7 | ≥8.5 |
| initial water retention after day 1 | ≥5.5 | ≥6.5 | ≥7 |
| initial water retention after day 2 | ≥4.0 | ≥4.5 | ≥5 |
| initial water retention after day 3 | ≥2 | ≥3 | ≥4 |
| initial water retention after day 4 | ≥0.8 | ≥1.0 | ≥2 |

Preferred Characteristics for Initial Water Content (%):

| Characteristic | Preferred | More preferred | Most preferred |
|---|---|---|---|
| t0 initial water content | ≥70 | ≥80 | ≥85 |
| initial water content after day 1 | ≥65 | ≥75 | ≥82 |
| initial water content after day 2 | ≥60 | ≥70 | ≥80 |
| initial water content after day 3 | ≥50 | ≥65 | ≥70 |
| initial water content after day 4 | ≥5 | ≥50 | ≥55 |

Preferred Characteristics for Cycled Water Retention After Cycle 4 (kg/kg)

| Characteristic | Preferred | More preferred | Most preferred |
|---|---|---|---|
| t0 cycled water retention | ≥6.5 | ≥7.0 | ≥7.5 |
| cycled water retention after day 1 | ≥4.5 | ≥5.0 | ≥5.5 |
| cycled water retention after day 2 | ≥2.5 | ≥3.0 | ≥4.0 |
| cycled water retention after day 3 | ≥0.8 | ≥1.0 | ≥1.5 |
| cycled water retention after day 4 | ≥0.1 | ≥0.2 | ≥0.5 |

Preferred Characteristics for Cycled Water Content After Cycle 4(%)

| Characteristic | Preferred | More preferred | Most preferred |
|---|---|---|---|
| t0 cycled water content | ≥75 | ≥80 | ≥85 |
| cycled water content after day 1 | ≥72 | ≥77 | ≥82 |
| cycled water content after day 2 | ≥70 | ≥75 | ≥80 |
| cycled water content after day 3 | ≥50 | ≥60 | ≥70 |
| cycled water content after day 4 | ≥10 | ≥50 | ≥65 |

Preferred Characteristics for VSE Water Content (%)

| Characteristic | Preferred | More preferred | Most preferred |
|---|---|---|---|
| VSE water content after vacuum of −3.2 cm | ≥85 | ≥90 | ≥92 |
| VSE water content after vacuum of −10 cm | ≥70 | ≥80 | ≥85 |
| VSE water content after vacuum of −32 cm | ≥35 | ≥40 | ≥50 |
| VSE water content after vacuum of −50 cm | ≥20 | ≥30 | ≥40 |
| VSE water content after vacuum of −100 cm | ≥15 | ≥30 | ≥40 |

Preferred Characteristics for WOK Water Content (%)

| Characteristic | Preferred | More preferred | Most preferred |
|---|---|---|---|
| WOK water content after 15 minutes | ≥50 | ≥65 | ≥75 |
| WOK water content after 30 minutes | ≥65 | ≥75 | ≥80 |

The invention claimed is:

1. A mineral wool batt having an average density of at least 20 kg/m$^3$, comprising
    an absorbent core layer substantially free of binder comprising needled mineral wool fibres and superabsorbent particles; and
    a first mineral wool barrier layer adjacent to the core layer, the first mineral wool barrier layer having a density greater than the density of the core layer.

2. The mineral wool batt of claim 1 wherein the absorbent core layer is positioned between the first mineral wool barrier layer and a second mineral wool barrier layer adjacent to the core layer having a density greater than the density of the core layer, where each of the first and/or second barrier layers prevents substantial escape or contributes to preventing escape of the superabsorbent particles from the absorbent core layer.

3. The mineral wool batt of claim 2, wherein the first and/or second mineral wool barrier layer(s) comprises needled mineral wool substantially free of binder.

4. The mineral wool batt of claim 1, wherein the mineral wool batt comprises a quantity of superabsorbent particles in the range of 10 g/m² to 250 g/m².

5. The mineral wool batt of claim 1, wherein the mineral wool batt has at least one of or any combination of the following characteristics:
   A t0 initial water retention of at least 6.5 times its own weight and/or
   A t0 initial water content of at least 70% and/or
   A cycle 4, cycled water retention after 2 days of at least 2.5 times its own weight and/or
   A cycle 4, cycled water retention after 2 days of at least 75% and/or
   A VSE water content after vacuum of −10 cm of at least 70% and/or
   A WOK water content after 30 minutes of at least 65%.

6. A method of manufacturing a mineral wool batt having an average density of at least 20 kg/m³, comprising the steps of:
   providing a semi-finished mineral wool batt substantially free of binder;
   distributing super absorbent particles on a surface of the semi-finished mineral wool batt so that the superabsorbent particles are supported at the surface of the semi-finished mineral wool batt and/or providing superabsorbent particles within the semi-finished mineral wool batt;
   needling the semi-finished mineral wool batt so at to push any superabsorbent particles supported at the surface towards a core of the semi-finished mineral wool batt and/or increase the distribution within the core of the semi-finished mineral wool batt of any superabsorbent particles initially provided within the semi-finished mineral wool batt; and
   providing by needling a first mineral wool barrier layer adjacent to the core layer having a density which is greater than the density of the core of the semi-finished mineral wool batt.

7. The method of claim 6, further comprising the step of providing by needling a second mineral wool barrier layer adjacent to the core and having a density which is greater than the density of the core of the semi-finished mineral wool batt so that the core is positioned between the first and second mineral wool barrier layers.

8. The method of claim 7, wherein the needling comprises simultaneously needling upper and lower surfaces of the mineral wool batt to form the first and second barrier layer(s).

9. The method of claim 6, further comprising the step of packaging the mineral wool batt incorporating the superabsorbent particles in its core in a compressed configuration.

10. The method of claim 9, wherein between the step of the semi-finished mineral wool batt being provided and the step of the mineral wool batt being packaged, the temperature of the core of the mineral wool batt is not raised above 120° C.

11. A method of retaining water for the growth of vegetation, comprising using the mineral wool batt of claim 1 as a water retention medium in the growth of vegetation.

12. The method of claim 11, wherein the mineral wool batt has at least one of or any combination of the following characteristics:
   A t0 initial water retention of at least 6.5 times its own weight and/or
   A t0 initial water content of at least 70% and/or
   A cycled 4 cycled water retention after 2 days of at least 2.5 times its own weight and/or
   A cycled 4 cycled water retention after 2 days of at least 75% and/or
   VSE water content after vacuum of −10 cm of at least 70% and/or
   A WOK water content after 30 minutes of at least 65%.

13. The method of claim 11, wherein the mineral wool batt comprises an absorbent layer comprising mineral wool fibres, wherein the absorbent layer comprises needled mineral wool fibres and superabsorbent particles.

14. The method of claim 11, wherein the mineral wool batt is manufactured by a method comprising the steps of:
   providing a semi-finished mineral wool batt substantially free of binder;
   distributing super absorbent particles on a surface of the semi-finished mineral wool batt so that the superabsorbent particles are supported at the surface of the semi-finished mineral wool batt and/or providing superabsorbent particles within the semi-finished mineral wool batt; and
   needling the semi-finished mineral wool batt so at to push any superabsorbent particles supported at the surface towards a core of the semi-finished mineral wool batt and/or increase the distribution within the core of the semi-finished mineral wool batt of any superabsorbent particles initially provided within the semi-finished mineral wool batt.

15. The mineral wool batt of claim 4, wherein the mineral wool batt comprises a quantity of superabsorbent particles in the range of 50 g/m² to 200 g/m².

* * * * *